United States Patent
Cheng et al.

(10) Patent No.: US 8,928,848 B2
(45) Date of Patent: Jan. 6, 2015

(54) PIXEL STRUCTURE COMPRISING A FIRST PIXEL ELECTRODE HAVING A PLURALITY OF FIRST BRANCHES AND A SECOND PIXEL ELECTRODE HAVING A PLURALITY OF SECOND BRANCHES

(71) Applicant: Au Optronics Corporation, Hsinchu (TW)

(72) Inventors: Wei-Yuan Cheng, Taichung (TW);
Chin-An Tseng, Taipei (TW);
Yen-Heng Huang, New Taipei (TW);
Chia-Hui Pai, Taichung (TW);
Chung-Kai Chen, Taichung (TW);
Wen-Hsien Tseng, Taichung (TW);
Ting-Yi Cho, New Taipei (TW);
Chia-Yu Lee, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/332,389

(22) Filed: Jul. 16, 2014

(65) Prior Publication Data

US 2014/0327864 A1 Nov. 6, 2014

Related U.S. Application Data

(62) Division of application No. 12/758,023, filed on Apr. 11, 2010, now Pat. No. 8,817,215.

(30) Foreign Application Priority Data

Dec. 11, 2009 (TW) ................................. 98142528 A (51) Int. Cl.
*G02F 1/1343* (2006.01)
*G02F 1/136* (2006.01)

(52) U.S. Cl.
CPC ................................. *G02F 1/134309* (2013.01)
USPC ............................... 349/142; 349/48; 349/144

(58) Field of Classification Search
USPC ........................................... 349/48, 141–144
See application file for complete search history.

(56) References Cited

U.S. PATENT DOCUMENTS

2009/0135321 A1* 5/2009 Su et al. .......................... 349/37

* cited by examiner

*Primary Examiner* — Paul Lee
(74) *Attorney, Agent, or Firm* — Jianq Chyun IP Office (57) ABSTRACT

A pixel structure including a substrate, a scan line, a first data line, a second data line, a first pixel unit and a second pixel unit is provided. The first pixel unit includes a first active device and a first pixel electrode. The first active device is electrically connected to the scan line and the first data line. The first pixel electrode electrically connected to the first active device and has a plurality of first branches. The first branches outwardly extend from a center of the first pixel unit, and a projection of the first branches are separated from a projection of the adjacent first data line projecting onto the substrate, and the first pixel electrode is apart from the adjacent first data line with a distance. The second pixel unit located between the first data line and the second data line.

5 Claims, 8 Drawing Sheets

PIXEL STRUCTURE COMPRISING A FIRST PIXEL ELECTRODE HAVING A PLURALITY OF FIRST BRANCHES AND A SECOND PIXEL ELECTRODE HAVING A PLURALITY OF SECOND BRANCHES

CROSS-REFERENCE TO RELATED APPLICATION

This is a divisional application of patent application Ser. No. 12/758,023, filed on Apr. 11, 2010, now allowed, which claims the priority benefit of Taiwan application serial no. 98142528, filed on Dec. 11, 2009. The entirety of the above-mentioned patent application is hereby incorporated by reference herein and made a part of specification.

BACKGROUND OF THE INVENTION

1. Field of the Invention

The present invention relates generally to pixel structure, and more particularly, to a pixel structure capable of improving the display quality.

2. Description of Related Art

Nowadays, the market demands the liquid crystal display (LCD) panel to develop its functions towards to high contrast ratio, no gray scale inversion, little color shift, high luminance, full color, high color saturation, high response speed and wide viewing angle. Currently, the technologies capable of fulfilling the demands include the twist nematic (TN) LCD having a wide viewing film, the in-plane switching (IPS) LCD, the fringe field switching (FFS) LCD and the multi-domain vertically aligned (MVA) LCD.

In a conventional MVA-LCD panel, an alignment structure is formed, such that liquid crystal (LC) molecules in different areas tilt in different angles and accomplish the wide viewing angle effect. The alignment structure includes alignment protrusions and alignment slits disposed on electrodes. However, the alignment protrusion and the liquid crystal molecules surrounding the alignment slit usually have disclination and thereby causing light leakage or disclination phenomenon, and further lowering the display contrast of the LCD panel. Thus, a light shielding layer corresponding to the alignment protrusions or the alignment slits is disposed to improve the leakage of light or disclination phenomenon. However, an aperture ratio of the display is limited thereby.

Hence, how to balance between the capacitance of the demanding of the wide viewing angle of the pixel structure and the opening ratio of the pixel structure has become a challenge in the design of the pixel structure.

SUMMARY OF THE INVENTION

The present invention provides a pixel structure having a high aperture ratio.

The invention provides a pixel structure capable of reducing the discontinuously display phenomenon to obtain better displaying quality.

The present invention provides a pixel structure comprising a substrate, a scan line, a first data line and a first pixel unit. The scan line and the first data line are disposed on the substrate. The first pixel unit includes an active device and a first pixel electrode. The active device is electrically connected to the scan line and the first data line. The first pixel electrode is electrically connected to the first active device and the first pixel electrode has a first stripe pattern substantially parallel to the scan line and a plurality of first branches electrically connected to the first stripe pattern. One side of the first stripe pattern is connected to the first branches extending towards to the scan line and the other side of the first stripe pattern overlaps the scan line. A first overlapping width of the first stripe pattern with the scan line is about 40%~90% of a width of the first stripe pattern.

According to one embodiment of the present invention, the first branches are separated from a projection of the first data line projecting onto the substrate, and the first pixel electrode is apart from the first data line with a distance.

According to one embodiment of the present invention, the first pixel electrode further comprises a main trunk portion and a branch portion, and the main trunk portion is parallel to the first data line, and the branch portion is parallel to the scan line. The first pixel unit is divided into four domains through the main trunk portion and the branch portion, and the first branches outwardly extend from an intersection of the main trunk portion and the branch portion. The first branches in each of the domains are substantially parallel to one another.

According to one embodiment of the present invention, the first pixel unit further comprises a storage capacitor structure. The capacitor structure comprises a bottom capacitor electrode and an upper capacitor electrode. The upper capacitor electrode is located over the bottom capacitor electrode and the upper capacitor electrode is in the same layer as the first pixel electrode. The main trunk portion and the upper capacitor electrode are separated from each other, and the upper capacitor electrode is connected to the first pixel electrode through one of the branches near the first data line.

According to one embodiment of the present invention, the pixel structure further comprises a color filter disposed between the first active device and the first pixel electrode. The color filter has an opening substantially located at the intersection of the main trunk portion and the branch portion of the first pixel electrode, and the first pixel electrode is electrically connected to the first active device through the opening. Further, the first pixel unit comprises a contact pattern located at the intersection of the main trunk portion and the branch portion of the first pixel electrode and connected to a drain of the first active device. The first pixel electrode is connected to the contact pattern through the opening, and the first pixel electrode covers the contact pattern in a full range manner. Alternatively, a portion of the branches overlap at least a portion of the contact pattern.

According to one embodiment of the present invention, the pixel structure further comprises a second pixel unit and a second data line. The second pixel unit comprises a second active device and a second pixel electrode. The second active device is electrically connected to the scan line and the second data line. The second pixel electrode is electrically connected to the second active device, and the second pixel electrode has a plurality of second branches, and the second branches extend towards to the first data line and the second data line and cross over the first data line and the second data line.

According to one embodiment of the present invention, the first pixel unit and the second pixel unit are configured between the first data line and the second data line.

According to one embodiment of the present invention, the second pixel electrode further comprises a second stripe pattern substantially parallel to the scan line. One side of the second stripe pattern is connected to the second branches extending towards to the scan line, and the other side of the second stripe pattern overlaps the scan line. More particularly, a second overlapping width of the second stripe pattern with the scan line is about 40%~90% of a width of the second stripe pattern of the second pixel electrode.

According to one embodiment of the present invention, a projection of the first branches are separated from a projection of the adjacent first data line projecting onto the substrate, and the first pixel electrode is apart from the adjacent first data line with a distance. Specifically, the distance is about 3~9 micrometers.

The present invention provides a pixel structure comprising a substrate, a scan line, a first data line, a second data line, a first pixel unit and a second pixel unit. The scan line, the first data line and the second data line are disposed on the substrate. The first pixel unit is located between the first data line and the second data line, and the first pixel unit includes a first active device and a first pixel electrode. The active device is electrically connected to the scan line and the first data line. The first pixel electrode is electrically connected to the first active device, and the first pixel electrode comprises a plurality of first branches. The first branches outwardly extend from a center of the first pixel unit, and a projection of the first branches are separated from a projection of the adjacent first data line projecting onto the substrate, and the first pixel electrode is apart from the adjacent first data line with a distance. The second pixel unit is located between the first data line and the second data line, and the second pixel unit includes a second active device and a second pixel electrode. The second active device is electrically connected to the scan line and the second data line. The second pixel electrode is electrically connected to the second active device, and the second pixel electrode has a plurality of second branches. The second branches extend towards to the first data line and the second data line and cross over the first data line and the second data line.

According to one embodiment of the present invention, the pixel structure further comprises a color filter located between the first active device and the first pixel electrode and between the second active device and the second pixel electrode.

The present invention provides a pixel structure comprising a substrate, a scan line, a first data line, a first pixel unit and a color filter. The scan line and the first data line are disposed on the substrate. The first pixel unit is located between the first data line and the second data line, and the first pixel unit includes a first active device and a first pixel electrode. The active device is electrically connected to the scan line and the first data line. The first pixel electrode is electrically connected to the first active device, and the first pixel electrode comprises a plurality of first branches, a main trunk portion and a branch portion. The main trunk portion is parallel to the first data line, and the first branches outwardly extend from an intersection of the main trunk portion and the branch portion. The color filter is disposed between the first active device and the first pixel electrode and the color filter has an opening substantially located at the intersection of the main trunk portion and the branch portion. The first pixel electrode is electrically connected to the first active device through the opening.

According to one embodiment of the present invention, the first pixel unit comprises a contact pattern located at the intersection of the main trunk portion and the branch portion and connected to a drain of the first active device. The first pixel electrode is connected to the contact pattern through the opening, and the first pixel electrode covers the contact pattern in a full range manner.

According to one embodiment of the present invention, the first pixel unit comprises a contact pattern located at the intersection of the main trunk portion and the branch portion of the first pixel electrode and connected to a drain of the first active device. The first pixel electrode is connected to the contact pattern through the opening, and a portion of the branches overlap at least a portion of the contact pattern.

The present invention provides a pixel structure comprising a substrate, a scan line, a first data line and a first pixel unit. The scan line and the first data line are disposed on the substrate. The first pixel unit is located between the first data line and the second data line, and the first pixel unit comprises a first active device, a first pixel electrode and a storage capacitor structure. The first active device is electrically connected to the scan line and the first data line. The first pixel electrode is electrically connected to the first active device, and the first pixel electrode comprises a plurality of first branches, a main trunk portion and a branch portion. The main trunk portion is parallel to the first data line, and the first pixel unit is divided into four domains through the main trunk portion and the branch portion. The first branches outwardly extend from an intersection of the main trunk portion and the branch portion, and the first branches in each of the domains are substantially parallel to one another. The capacitor structure comprises a bottom capacitor electrode and an upper capacitor electrode. The upper capacitor electrode is located over the bottom capacitor electrode and the upper capacitor electrode is in the same layer as the first pixel electrode. The main trunk portion and the upper capacitor electrode are separated from each other, and the upper capacitor electrode is connected to the first pixel electrode through one of the branches near the first data line.

Accordingly, by properly controlling the ratio of the overlapping width of the stripe pattern of the pixel electrode in the pixel structure with the scan line to the width of the stripe pattern, the light leakage while the pixel structure displays an image can be decreased and the aperture ratio can be increased. In one embodiment, by controlling the design of the pixel electrode around the opening of the color filter, the disclination phenomenon due to unclear tilt directions of the liquid crystal molecules while the pixel structure is used to display an image can be suppressed. In one embodiment, since the upper capacitor electrode is connected to the pixel electrode through the branches near the periphery of the data line, a better display quality can be obtained. Moreover, in another embodiment, the branches of the pixel electrode of the second pixel unit of the pixel structure extending towards to the adjacent data line and crossing over the data lines would also lead to a better display quality. Hence, according to the aforementioned strategies, the disclination phenomenon happening in each domains of the pixel structure while the pixel structure of the present invention displays an image can be respectively eliminated. Thus, the light leakage can be decreased, the aperture ratio can be improved and the disclination can be suppressed. Therefore, the display quality is well improved.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides a pixel structure. The elements at the location of the pixel structure where the disclination phenomenon happens due to unclear tilt directions of the liquid crystal molecules while the pixel structure is used to display an image are individually improved. For instance, the design of the pixel electrode, the arrangement relationship between the pixel electrode and the scan line, the arrangement relationship between the pixel electrodes of the main pixel unit and the sub-pixel unit and the data lines of the main pixel unit and the sub-pixel unit or the design of the pixel electrode around the opening of the color filter can be adjusted. According to the relative relationship between the elements of the pixel structure and the design of the stacked area, the disclination phenomenon likely happening on the displayed image can be eliminated. Thus, the light leakage is decreased, the aperture ratio is increased and the display quality is improved. Several embodiments of the present invention will be described in details in the following with reference to accompany the drawings.

First Embodiment

Figure 1:
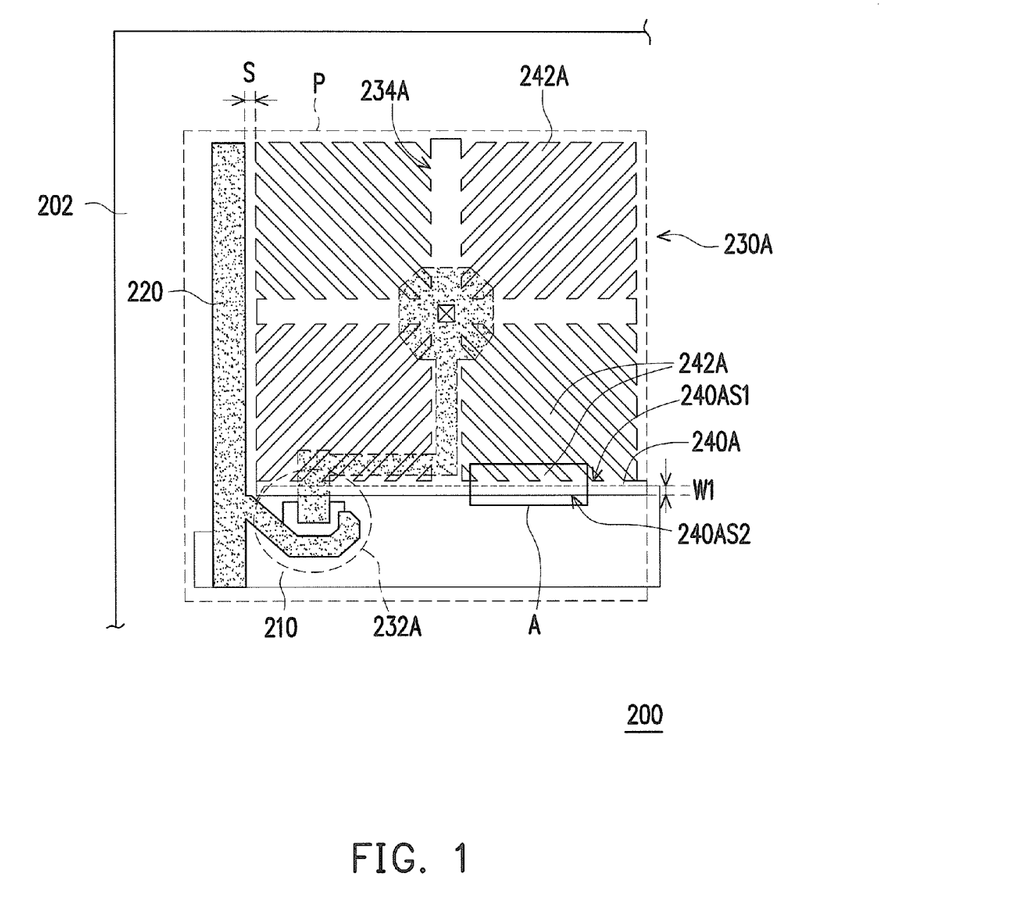
FIG. 1 is a schematic view of a pixel structure according to the first embodiment of the present invention.

FIG. 1 is a schematic view of a pixel structure according to the first embodiment of the present invention. As shown in FIG. 1, a pixel structure 200 is configured on a substrate 202 to define a plurality of pixel regions P on the substrate 202. In order to more clarify the related elements in the pixel structure 200, FIG. 1 only shows the pixel structure 200 in one of the pixel regions P as an exemplar of the present invention.

As shown in FIG. 1, the pixel structure 200 comprises a scan line 210, a first data line 220 and a first pixel unit 230A which are configured on the substrate 202. In the present embodiment, the first pixel unit 230A comprises a first active device 232A and a first pixel electrode 234A. The first active device 232A is electrically connected to the scan line 210 and the first data line 220. The first pixel electrode 234A is electrically connected to the first active device 232A and the first pixel electrode 234A has a first stripe pattern 240A substantially parallel to the scan line 210 and a plurality of first branches 242A electrically connected to the first stripe pattern 240A. One side of the first stripe pattern 240A is connected to the first branches 242A extending towards to the scan line 210 and the other side 240AS2 of the first stripe pattern 240A overlaps a portion of the scan line 210. More particularly, the overlapping width of the first stripe pattern 240A with the scan line 210 is about 40%~90% of the width of the first stripe pattern 240A. Accordingly, the display quality of the pixel structure 200 can be optimized.

Figure 2A:
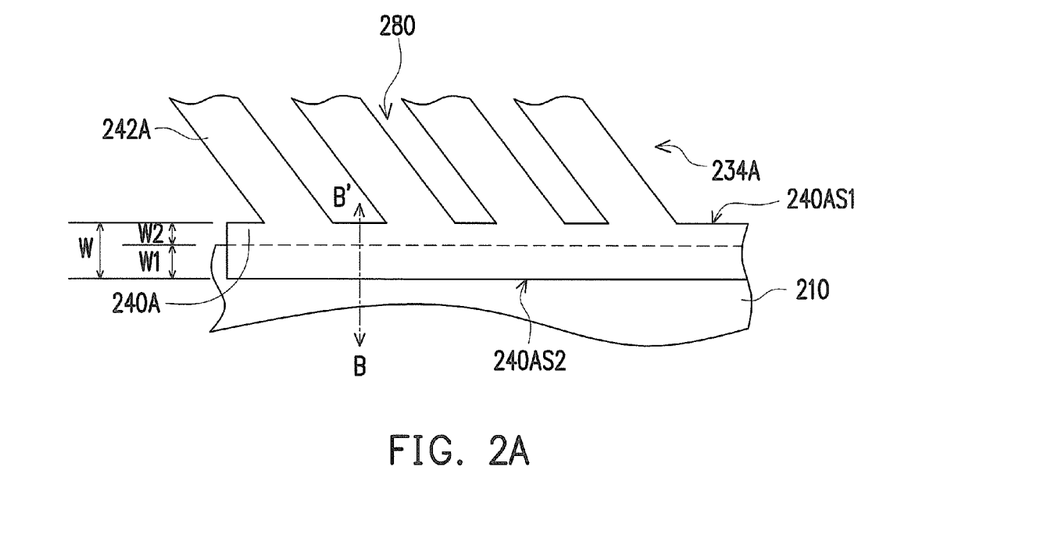
FIG. 2A is a partial enlarged view of the region A of the pixel structure in FIG. 1.
Figure 2B:
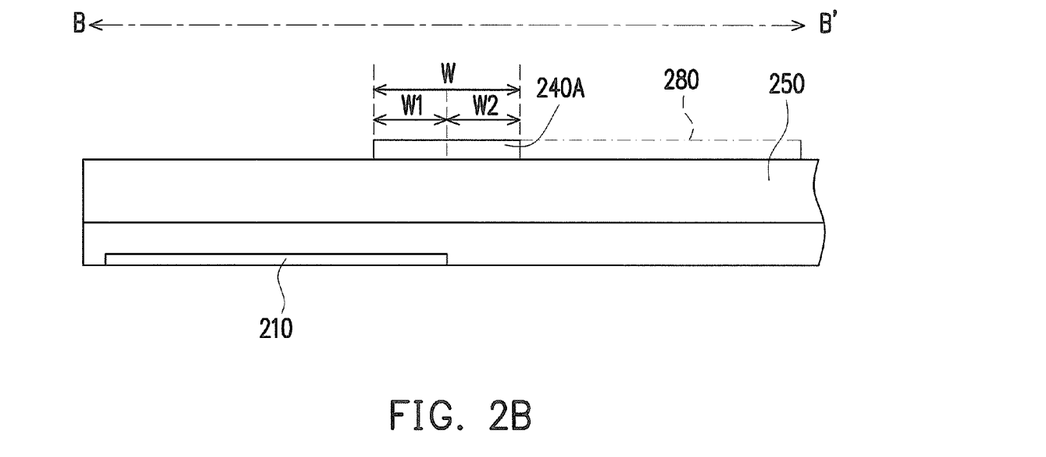
FIG. 2B is a schematic cross-sectional view of FIG. 2A.

More specifically, FIG. 2A is a partial enlarged view of the region A of the pixel structure in FIG. 1 and FIG. 2B is a schematic cross-sectional view of FIG. 2A. As shown in FIG. 2A and FIG. 2B, a slit 280 is located between the adjacent first branches 242A of the first pixel electrode 234A. As shown in FIG. 2A and FIG. 2B, it is assumed that the overlapping width of the first stripe pattern 240A with the scan line 210 is denoted as W1 and the width of the first stripe pattern 240A without overlapping with the scan line 210 is denoted as W2, wherein the width W of the stripe width 240 is the sum of W1 and W2. In the present embodiment, the overlapping width W1 of the first stripe pattern 240A with the scan line 210 is about 40%~90% of the width W of the first stripe pattern 240A. Further, the overlapping width W1 of the first stripe pattern 240A with the scan line 210 is about 1.5~3.5 micrometers. When the pixel structure 200 is applied to the design of the ultra high aperture, the preferred ratio of W1 to W2 is 4:1. That is, the ratio of W1 to W is about 80%, which can adequately decrease the light leakage phenomenon. Moreover, when the pixel structure 200 is applied to the designs of the color filter on array (COA) or the black matrix on array (BOA), the preferred ratio of W1 to W2 is about 1:1. That is, the ratio of W1 to W is about 50%, which can adequately decrease the light leakage phenomenon so as to obtain a better display quality.

Taking the COA as an exemplar, FIG. 2B is a schematic cross-sectional view of the pixel structure in FIG. 2A line BB. As shown in FIG. 2A and FIG. 2B, the pixel structure 200 further comprises a color filter 250. The color filter 250 is located between the first pixel electrode 234A and the scan line 210. The overlapping width W1 of the first stripe pattern 240A with the scan line 210 and the width W2 of the first stripe pattern 240A without overlapping with the scan line 210 are 2.5 micrometers. Furthermore, it should be noticed that, as shown in FIG. 1, in the present embodiment, the projection of the first branches 242A projecting on the substrate 202 are separated from the projection of the first data line 220 projecting on the substrate 202. Also, the first pixel electrode 234A is apart from the first data line 220 with a distance S and the distance S is at least about 3 micrometers. Preferably, the distance S is about 3~9 micrometers.

Hence, as for the pixel structure 200 of the first embodiment of the present invention, by properly controlling the ratio of the overlapping width W1 of the first stripe pattern 240A with the scan line 210 to the width of the first stripe pattern 240A, the light leakage is decreased, the aperture ratio is increased and the display quality is improved.

Moreover, the designer can integrate the pixel structure of the first embodiment with portions or all of the techniques mentioned in the following embodiments according to the practical requirement of the product so as to further improve the display effect of the pixel structure. Also, the designer can only implement one of the techniques mentioned in the following embodiments to instantly improve the disclination phenomenon and to improve the display quality.

Second Embodiment

Figure 3:
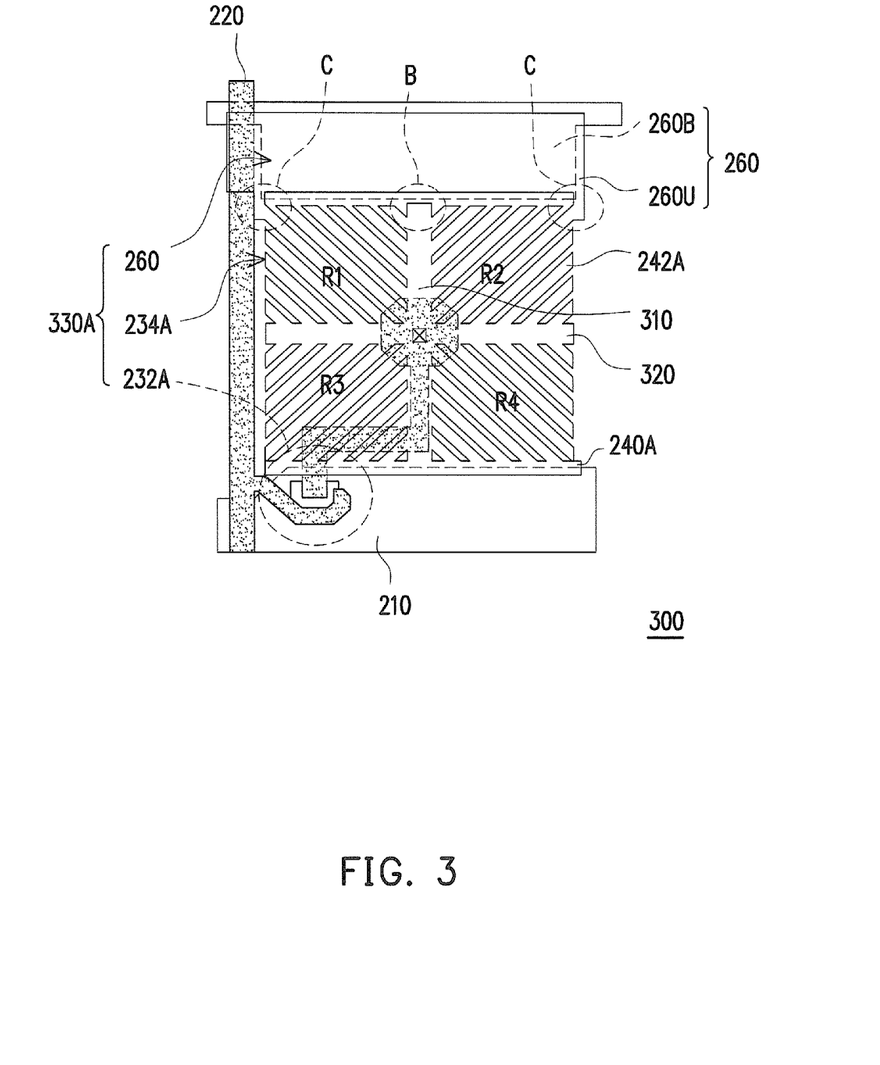
FIG. 3 is a schematic partial enlarged view of a pixel structure according to the second embodiment of the present invention.

FIG. 3 is a schematic partial enlarged view of a pixel structure according to the second embodiment of the present invention. As shown in FIG. 3, in a pixel structure 300 of the present embodiment, the first pixel unit 330A is similar to the first pixel unit 230A of the first embodiment. The difference between the first pixel unit 330A and the first pixel unit 230A is that the first pixel unit 330A further comprises a storage capacitor structure 260.

More specifically, as shown in FIG. 3, the first pixel electrode 234A has a main trunk portion 310 parallel to the first data line 220 and a branch portion 320 parallel to the scan line 210. The first pixel unit 330A is divided into four domains R1, R2, R3 and R4 through the main trunk portion 310 and the branch portion 320. The first branches 242A outwardly extend from the intersection of the main trunk portion 310 and the branch portion 320. The first branches 242A in each of the domains R1, R2, R3 and R4 are substantially parallel to one another. When the pixel structure 300 is used to display an image, the liquid crystal molecules located over the first pixel unit 330A can tilt towards to four different directions in different tilt levels so as to achieve the display effect of the wide viewing angle. However, the present invention is not limited to the number of the domains of each of the pixel unit. That is, the types and the numbers of the main trunk portion 310 and the branch portion 320 can be designed according to the requirement of the product.

It should be noticed that the pixel structure 300 of the present embodiment can further comprises a storage capacitor structure 260. The storage capacitor structure 260 includes a bottom capacitor electrode 260B and an upper capacitor electrode 260U. As shown in the top view of the pixel structure, the first pixel electrode 234A is located between the bottom capacitor electrode 260B and the scan line 210. Moreover, as shown in FIG. 3, in the cross-sectional view of the pixel structure, the upper capacitor electrode 260U is located above the bottom capacitor electrode 260B. The upper capacitor electrode 260U can be the same layer as the first pixel electrode 234A. That is, the upper capacitor electrode 260U and the first pixel electrode 234A can be formed from the same film layer, and made of the same material and can be formed in the same photolithography process. It should be noticed that the disclination phenomenon easily happens at the portion of the displayed image corresponding to the connection portion of the main trunk portion 310 and the upper electrode 260U. Hence, in the present embodiment as shown in FIG. 3, the main trunk portion 310 is separated from the upper capacitor electrode 260U (the portion B shown in FIG. 3) and the upper capacitor electrode 260U is connected to the first pixel electrode 234A through the first branches 242A near the periphery of the data line (the portion C shown in FIG. 3). In other words, the connection portion of the upper capacitor electrode 260U and the first pixel electrode 234A is located at the corner portion of the first pixel electrode 234A. Thus, while the pixel structure 300 is used to display an image, a better display effect can be obtained.

Noticeably, in the present embodiment, the pixel structure 300 mainly adopts the adequate connection relationship between the pixel electrode in the pixel unit and the upper capacitor electrode 260U of the storage capacitor structure 260 to decrease the light leakage, to increase the aperture ratio and to improve the display quality. Although the pixel structure 300 of the present embodiment is described in a way of integrating the techniques of the first embodiment and the second embodiment, the designer can solely utilize that the upper capacitor electrode 260U is connected to the pixel electrode through the first branches 242A near the periphery of the data line to decrease the disclination phenomenon and to improve the display effect according to the practical requirements. The present invention, according to the practical requirements of the product, is not limited to that the pixel structure should be accompanied with the first stripe pattern mentioned in the first embodiment.

Third Embodiment

Figure 4A:
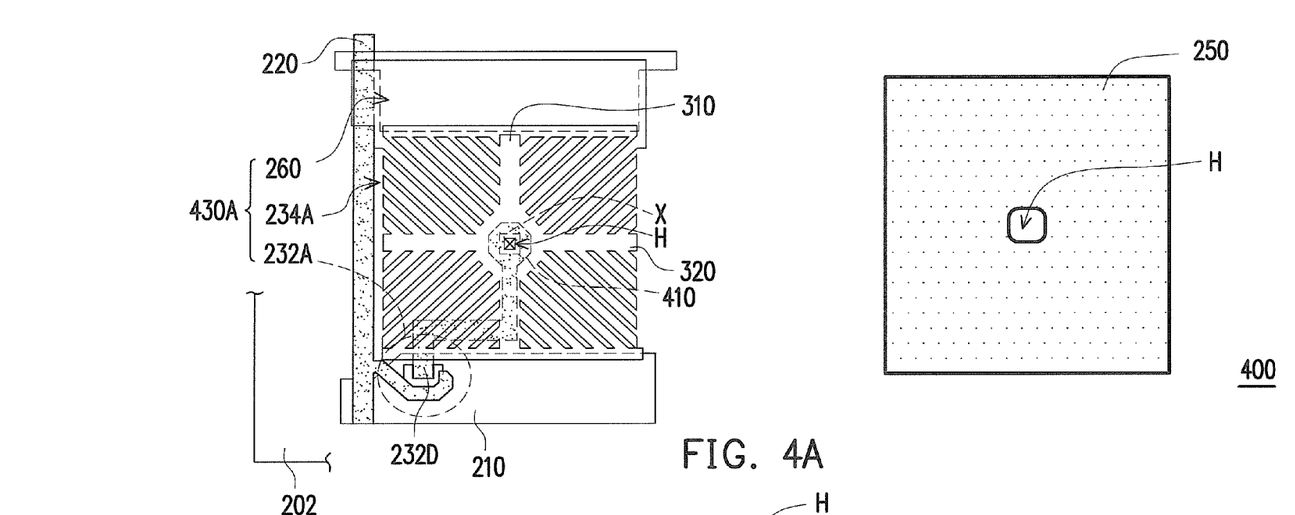
FIG. 4A is a top view of a pixel structure according to the third embodiment of the present invention.
Figure 4B:
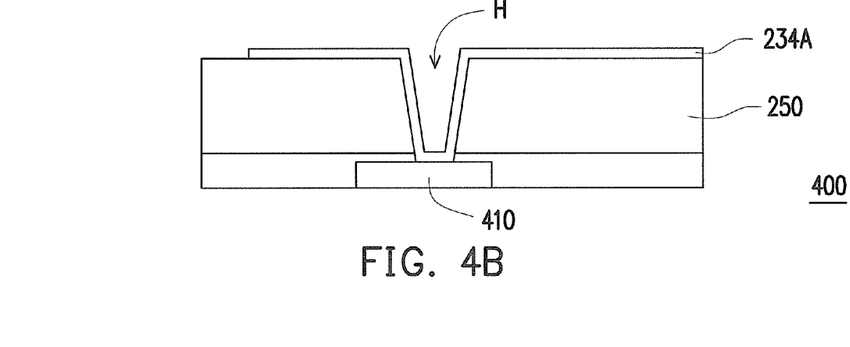
FIG. 4B is a partial enlarged view of the pixel structure in FIG. 4A.

FIG. 4A is a top view of a pixel structure according to the third embodiment of the present invention and FIG. 4B is a partial enlarged view of the pixel structure in FIG. 4A. As shown in FIG. 4A and FIG. 4B, a pixel structure 400 of the present embodiment is similar to the pixel structures mentioned in the previous embodiments except that a first pixel unit 430A of the pixel structure 400 of the present embodiment further comprises a color filter 250 located between the first active device 232A and the first pixel electrode 234A. For more clarifying, the color filter 250 is removed from the left of FIG. 4A and is individually shown at the right of FIG. 4A.

As shown in FIG. 4A and FIG. 4B, in the present embodiment, the pixel structure 400 is a pixel structure with the COA. As shown in FIG. 4A and FIG. 4B, the color filter 250 has an opening H. The opening H is substantially located at the intersection X of the main trunk portion 310 and the branch portion 320, and the first pixel electrode 234A is electrically connected to the first active device 232A through the opening H. More specifically, the first pixel electrode 234A is electrically connected to a contact pattern 410 at the intersection X of the main trunk portion 310 and the branch portion 320 through the opening H.

For more clarifying, the partial enlarged view of the intersection X of the main trunk 310 and the branch portion 320 is used to describe the present embodiment.

Figure 5A:
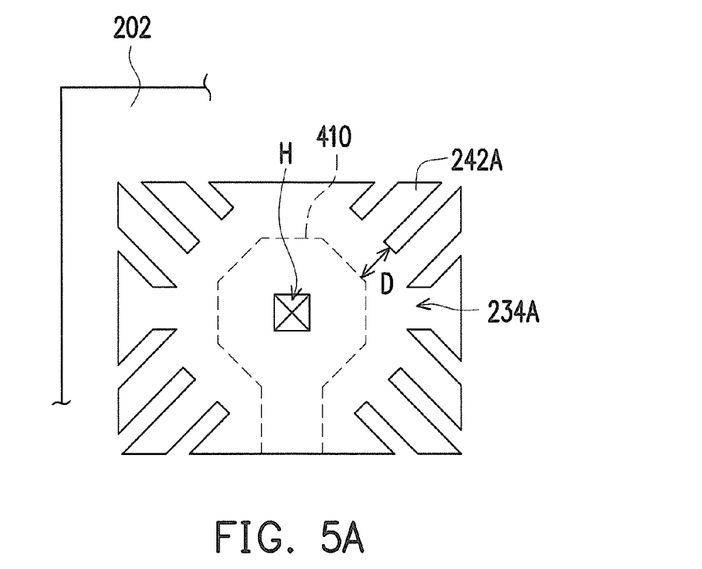
FIG. 5A is a schematic partial enlarged view showing a first pixel electrode in the pixel structure in FIG. 4A electrically connected to a first active device through an opening of a color filter.

FIG. 5A is a schematic partial enlarged view showing a first pixel electrode in the pixel structure in FIG. 4A electrically connected to a first active device through an opening of a color filter. As shown in FIG. 5A and FIG. 4A, the first pixel unit 430A further comprises a contact pattern 410 at the intersection X of the main trunk portion 310 and the branch portion 320. The contact pattern 410 is connected to a drain 232D (as shown in FIG. 4A) of the first active device 232A. In more detail, the contact pattern 410 can, for example, extend towards to the location below the opening H of the color filter 250 from the drain 232D of the active device 232A. The first pixel electrode 234A is connected to the contact pattern 410 through the opening H. More particularly, the first pixel electrode 234A covers the contact pattern 410 in a full range form. In further detail, the so-called full range form is that the projection of the first pixel electrode 234A projecting onto the substrate 202 covers the contact pattern 410. As shown in FIG. 5A, the first pixel electrode 234A as a whole covers the contact pattern 410. As shown in the top view of the pixel structure 400, the contact pattern 410 is located within the coverage of the first pixel electrode 234A and the periphery of the contact pattern 410 is apart from the first pixel electrode 234A with a distance D. The distance D is about 1~6 micrometers.

Figure 5B:
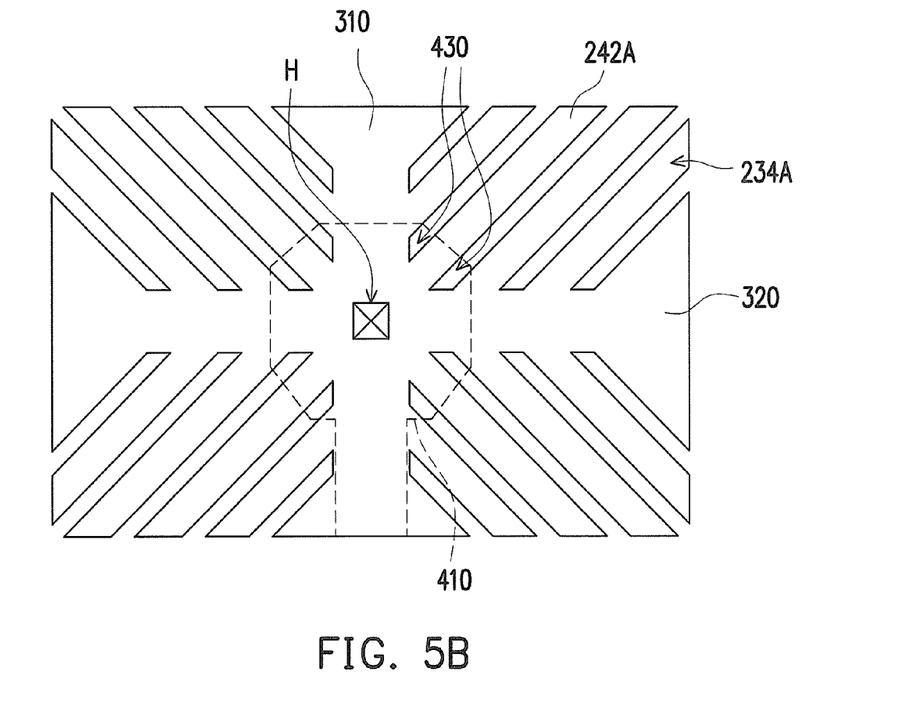
FIG. 5B is a schematic partial enlarged view showing another embodiment of the first pixel electrode in the pixel structure in FIG. 4A electrically connected to the first active device through the opening of a color filter.

Further, the layout that the first pixel electrode is electrically connected to the first active device through the opening of the color filter, except for the layout shown in FIG. 5A, also can be the layout shown in FIG. 5B. FIG. 5B is a schematic partial enlarged view showing another embodiment of the first pixel electrode in the pixel structure in FIG. 4A electrically connected to the first active device through the opening of a color filter. As shown in FIG. 5B, more particularly, a portion of the first branches 242A of the first pixel electrode 234A overlap at least a portion of the contact pattern 410. In more detail, as shown in FIG. 5B, a portion of the first branches 242A extend towards to the location over the contact pattern 410 so that the slit 430 between the first branches 242A is directly located above the contact pattern 410. It should be noticed that the first branches 242A of the first pixel electrode 234A covers the region around the opening H of the color filter 250 as shown in FIG. 5A or FIG. 5B so that the disclination phenomenon easily happening at the connection portion of the opening H of the color filter 250 and the first pixel electrode 234A can be eliminated and the viewer cannot perceives the disclination effect. Thus, the pixel structure 400 can provide a relatively better display quality.

Although the pixel structure 400 of the present embodiment is described in a way of integrating the techniques of the previous embodiments, the designer can solely utilize the design of the present embodiment in which the pixel electrode is controlled to be arranged around the opening of the color filter to decrease the disclination phenomenon and to improve the display effect according to the practical requirements. The present invention, according to the practical requirements of the product, is not limited to that the pixel structure mentioned above.

Fourth Embodiment

Figure 6:
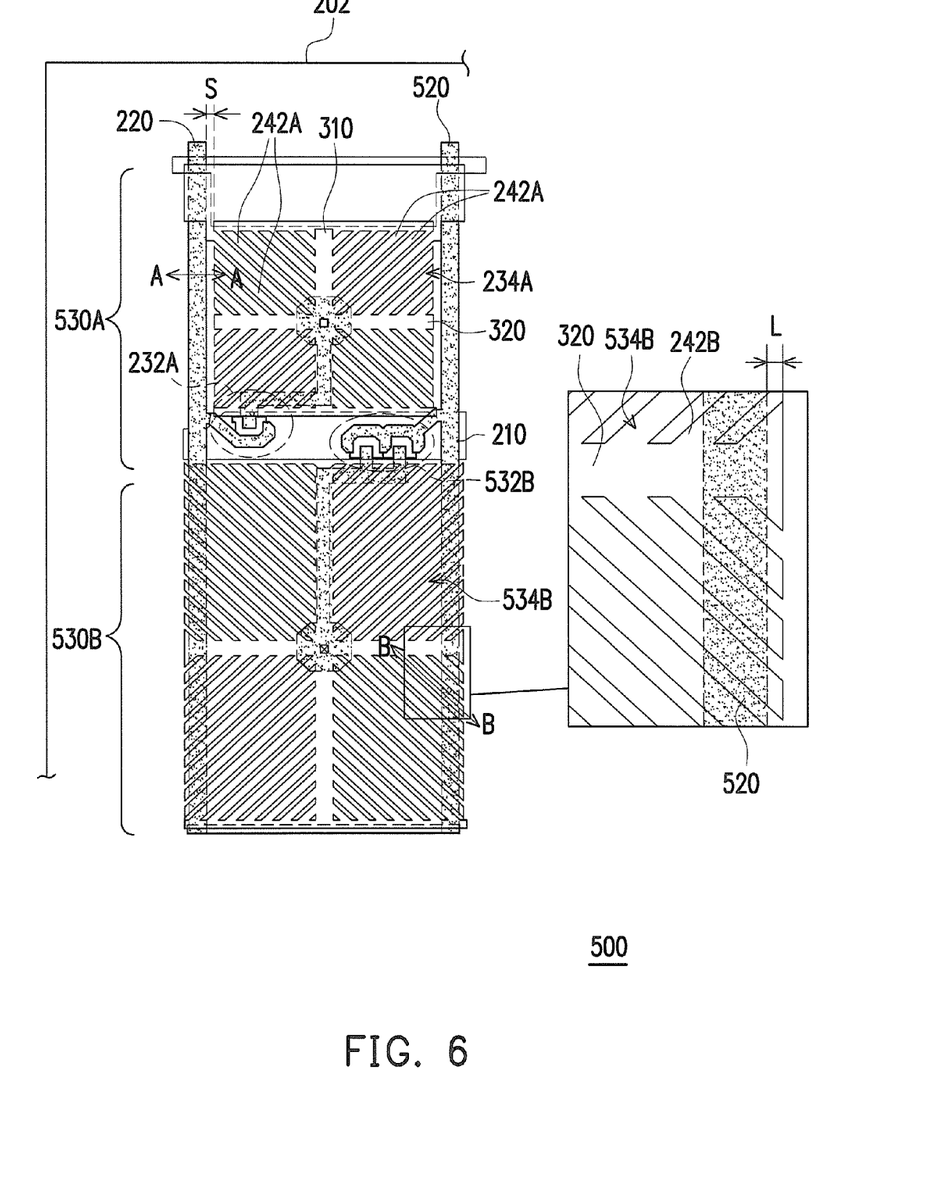
FIG. 6 is a top view and a schematic partial enlarged view of a pixel structure according to the fourth embodiment of the present invention.

FIG. 6 is a top view and a schematic partial enlarged view of a pixel structure according to the fourth embodiment of the present invention. As shown in FIG. 6, in the present embodiment, the pixel structure 500 comprises a scan line 210, a first data line 220, a second data line 520, a first pixel unit 530A and a second pixel unit 530B. As shown in FIG. 6, the first pixel unit 530A and the second pixel unit 530B are located between the first data line 220 and the second data line 520. More specifically, in the pixel structure 500, the second active device 532B and the first active device 232A are electrically connected to the same scan line 210, and the second active device 532B and the first active device 232A are electrically connected to the different data lines respectively.

As shown in FIG. 6, the second pixel unit 530B comprises the second active device 532B and the second pixel electrode 534B. The second active device 532B is electrically connected to the scan line 210 and the second data line 520, and the second pixel electrode 534B is electrically connected to the second active device 532B. More particularly, as shown in the enlarged view, the second pixel electrode 534B has a plurality of second branches 242B and the second branches 242B extend towards to the first data line 220 and the second data line 520 and cross over the first data line 220 and the second data line 520.

Figure 7A:
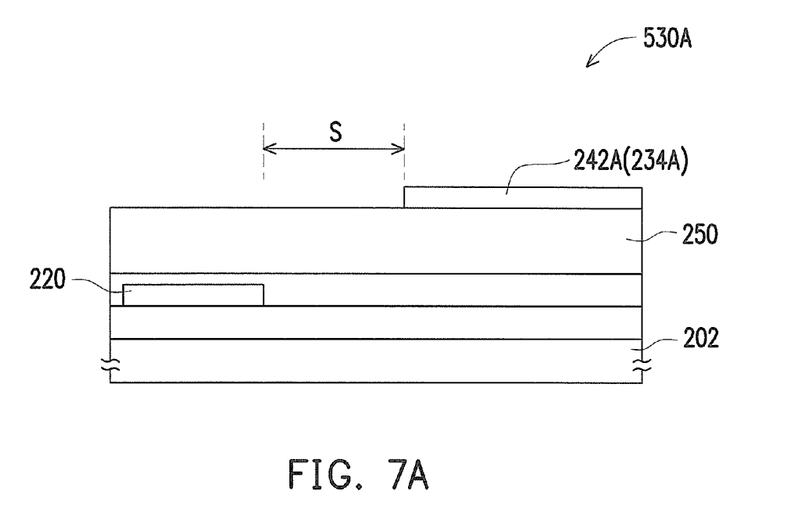
FIG. 7A and FIG. 7B are schematic cross-sectional views of the pixel structure in FIG. 6 respectively along line AA and line BB.
Figure 7B:
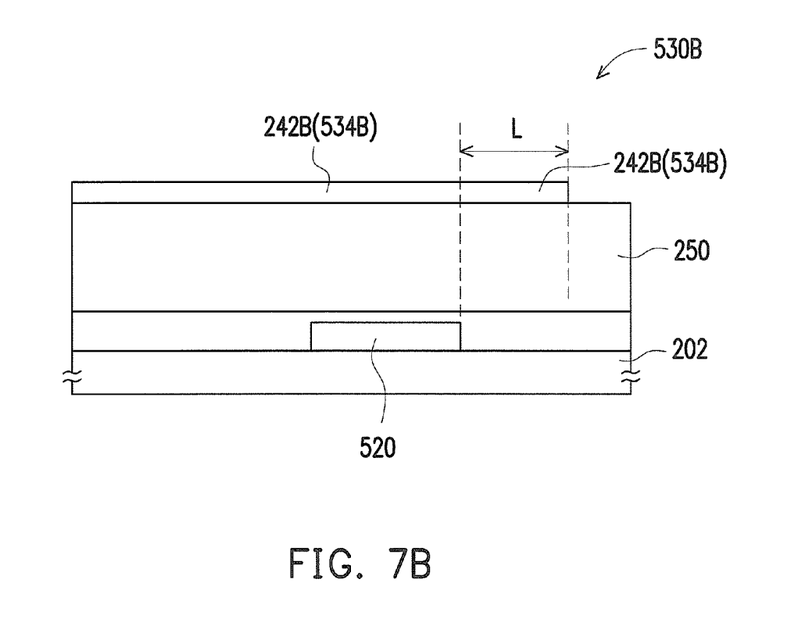

Further, FIG. 7A and FIG. 7B are schematic cross-sectional views of the pixel structure in FIG. 6 respectively along line AA and line BB. As shown in FIG. 7A, in the first pixel unit 530A of the present embodiment, the projection of the first branches 242A of the first pixel unit 234A projecting on the substrate 202 are separated from the projection of the first data line 220 projecting on the substrate 202. Also, the first pixel electrode 234A is apart from the first data line 220 with a distance S and the distance S is at least about 3 micronmeters. Preferably, the distance S is about 3~9 micronmeters. Then, as shown in FIG. 7B, in the second pixel unit 530B, the second pixel electrode 534B has a plurality of second branches 242B, and the second branches 242B extend towards to the first data line 220 and the second data line 520 and further cross over the first data line 220 and the second data line 520. That is, the second branches 242B of the second pixel electrode 534B extend from one side of the second data line 520 towards to the opposite side of the second data line 520. In one embodiment, the protruding length L of the second branches 242B of the second pixel electrode 534B protruding from the second data line 520 is, for example, about 2 micronmeters.

Noticeably, when the pixel structure 500 of the present embodiment is used to display an image, the first pixel unit 530A is used as a primary displaying unit and the second pixel unit 530B is used as a secondary displaying unit. Hence, the disclination phenomenon happening at the region of the second pixel electrode 534B adjacent to the data line can be alleviated and even completely eliminated. Thus, viewer hardly perceives the disclination effect on the displayed image. Further, the second pixel unit 530B used as the secondary displaying unit usually has a feature of lower gray scale. Thus, even the second branches 242B of the second pixel electrode 534B cross over the second data line 520, there is no concern about the signal interference. In other words, the pixel structure 500 can provides a relatively better display quality.

Although the pixel structure 500 of the present embodiment is described in a way of integrating the techniques of the previous embodiments, the designer can solely utilize the design of the present embodiment in which the second branches of the second pixel electrode of the second pixel unit extend towards to the adjacent data line and cross over the data line to decrease the disclination phenomenon and to improve the display effect according to the practical requirements. The present invention, according to the practical requirements of the product, is not limited to that the pixel structure mentioned above.

Figure 8A:
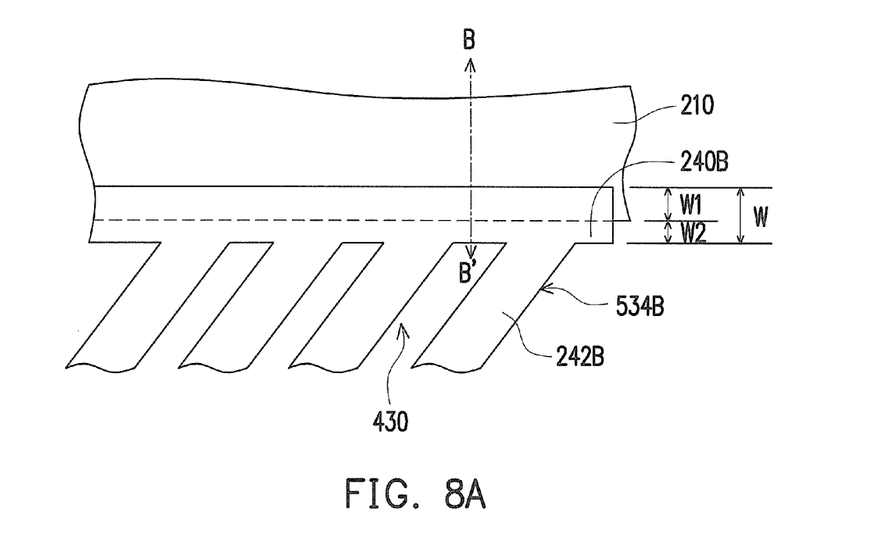
FIG. 8A and FIG. 8B are a schematic partial enlarged view and a schematic cross-sectional view of the pixel structure in FIG. 6 respectively.
Figure 8B:
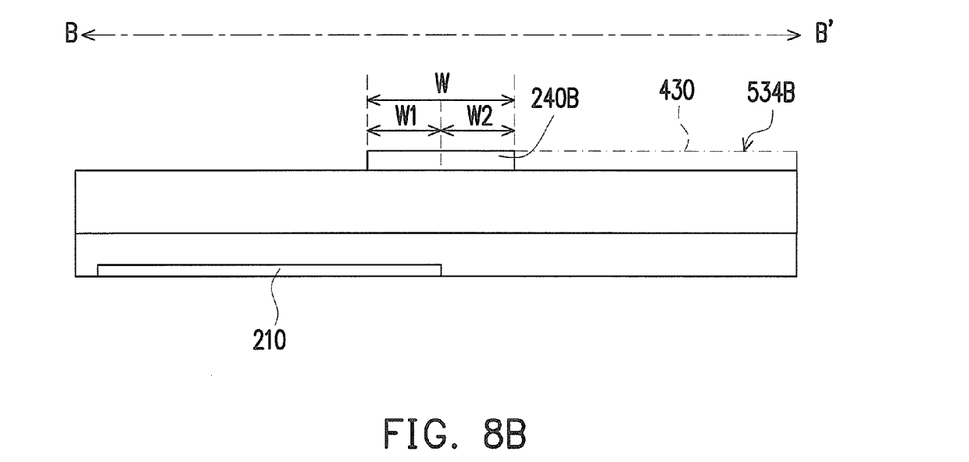

Moreover, the arrangement of the second pixel electrode 534B of the present embodiment can adopt the arrangement of the first pixel 234 of the first embodiment to further eliminate the disclination phenomenon while the pixel structure displays an image. In detail, FIG. 8A is a schematic partial enlarged view of the pixel structure in FIG. 6 and FIG. 8B is a schematic cross-sectional view of the pixel structure in FIG. 6. As shown in FIG. 8A and FIG. 8B, a slit 430 is located between the second branches 242B of the second pixel electrode 534B. As shown in FIG. 8A and FIG. 8B, the second pixel electrode 534B also comprises a second stripe pattern 240B substantially parallel to the scan line 210 (as shown in FIG. 6). In the present embodiment, one side of the second stripe pattern 240B of the second pixel electrode 534B is connected to the second branches 242B of the second pixel electrode 534B extending towards to the scan line 210, and the other side of the second stripe pattern 240B of the second pixel electrode 534B overlaps a portion of the scan line 210. More specifically, an overlapping width of the second stripe pattern 240B of the second pixel electrode 534B with the scan line 210 is about 40%~90% of a width of the second stripe pattern 240B of the second pixel electrode 534B. Further, the overlapping width of the second stripe pattern 240B with the scan line 210 is about 1.5~15 micronmeters. In other words, it is assumed that the overlapping width of the second stripe pattern 240B with the scan line 210 is denoted as W1 and the width of the second stripe pattern 240B without overlapping with the scan line 210 is denoted as W2, wherein the width W of the stripe width 240 is the sum of W1 and W2. When the pixel structure 500 is applied to the design of the ultra high aperture, the preferred ratio of W1 to W2 is 4:1. Hence, the light leakage phenomenon can be adequately decreased. Moreover, when the pixel structure 500 is applied to the designs of the color filter on array (COA) or the black matrix on array (BOA), the preferred ratio of W1 to W2 is about 1:1. Thus, the light leakage phenomenon can be adequately decreased to obtain a better display quality. In one embodiment, the overlapping width W1 of the second stripe pattern 240B with the scan line 210 and the width W2 of the second stripe pattern 240B without overlapping with the scan line 210 are 2.5 micronmeters.

In summary, the pixel structure of the present invention have at least the following advantages.

In the present invention, by properly controlling the ratio of the overlapping width of the stripe pattern of the pixel electrode in the pixel structure with the scan line to the width of the stripe pattern, the light leakage while the pixel structure displays an image can be decreased and the aperture ratio can be increased.

Also, in the present invention, by controlling the design of the pixel electrode around the opening of the color filter, the disclination phenomenon due to unclear tilt directions of the liquid crystal molecules while the pixel structure is used to display an image can be suppressed.

Moreover, in the present invention, the upper capacitor electrode is connected to the first pixel electrode through the branches near the periphery of the data line so that the disclination phenomenon due to unclear tilt direction of the liquid crystal molecules can be suppressed while the pixel structure displays an image and a relatively better display quality can be obtained.

Further, in the present invention, the second branches of the second pixel electrode of the second pixel unit extend towards to the adjacent data line and cross over the data line so that the disclination phenomenon due to unclear tilt directions of the liquid crystal molecules while the pixel structure is used to display an image can be suppressed and a relatively better display quality can be obtained.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A pixel structure, comprising:
   a substrate;
   a scan line, a first data line and a second data line disposed on the substrate; and
   a first pixel unit located between the first data line and the second data line, wherein the first pixel unit includes:
      a first active device electrically connected to the scan line and the first data line; and
      a first pixel electrode electrically connected to the first active device, wherein the first pixel electrode comprises a plurality of first branches, and the first branches outwardly extend from a center of the first pixel unit, and a projection of the first branches are separated from a projection of the adjacent first data line projecting onto the substrate, and the first pixel electrode is apart from the adjacent first data line with a distance; and
   a second pixel unit located between the first data line and the second data line, wherein the second pixel unit includes:
      a second active device electrically connected to the scan line and the second data line; and
      a second pixel electrode electrically connected to the second active device, wherein the second pixel electrode has a plurality of second branches, and the second branches extend towards to the first data line and the second data line and cross over the first data line and the second data line.

2. The pixel structure of claim 1, further comprising a color filter located between the first active device and the first pixel electrode and between the second active device and the second pixel electrode.

3. A pixel structure, comprising:
   a substrate;
   a scan line and a first data line disposed on the substrate; and
   a first pixel unit located between the first data line and the second data line, wherein the first pixel unit includes:
      a first active device electrically connected to the scan line and the first data line; and
      a first pixel electrode electrically connected to the first active device, wherein the first pixel electrode comprises a plurality of first branches, a main trunk portion and a branch portion, and the main trunk portion is parallel to the first data line, and the first branches outwardly extend from an intersection of the main trunk portion and the branch portion; and
   a color filter disposed between the first active device and the first pixel electrode, wherein the color filter has an opening substantially located at an intersection of the main trunk portion and the branch portion, and the first pixel electrode is electrically connected to the first active device through the opening.

4. The pixel structure of claim 3, wherein the first pixel unit further comprises a contact pattern located at the intersection of the main trunk portion and the branch portion and connected to a drain of the first active device, and the first pixel electrode is connected to the contact pattern through the opening, and the first pixel electrode covers the contact pattern in a full range manner.

5. The pixel structure of claim 3, wherein the first pixel unit further comprises a contact pattern located at the intersection of the main trunk portion and the branch portion and connected to a drain of the first active device, and the first pixel electrode is connected to the contact pattern through the opening, and a portion of the first branches overlap at least a portion of the contact pattern.

* * * * *